United States Patent [19]
Uchida

[11] 3,737,680
[45] June 5, 1973

[54] GATE CIRCUIT

[76] Inventor: Kozo Uchida, c/o Iwasaki Tsushinki Kabushiki Kaisha, 710 Kugayama 2-chome, Suginami-ku, Tokyo, Japan

[22] Filed: June 24, 1971

[21] Appl. No.: 156,496

Related U.S. Application Data

[63] Continuation of Ser. No. 752,209, Aug. 13, 1968, abandoned.

[52] U.S. Cl. .................................. 307/257, 307/259
[51] Int. Cl. ............................................ H03k 17/00
[58] Field of Search ............................. 307/257, 259; 328/151, 208

[56] References Cited

UNITED STATES PATENTS

| | | | |
|---|---|---|---|
| 2,639,386 | 5/1953 | Karpeles | 307/257 |
| 2,782,307 | 2/1957 | Von Siver et al. | 307/259 |
| 2,917,717 | 12/1959 | Thorsen | 307/259 |
| 3,146,357 | 8/1964 | Spallone | 307/259 |
| 3,011,129 | 11/1961 | Magleby et al. | 328/151 |
| 3,471,715 | 10/1969 | Castelli | 307/257 |
| 3,127,564 | 3/1964 | Giger | 328/208 |

*Primary Examiner*—Herman Karl Saalbach
*Assistant Examiner*—B. P. Davis
*Attorney*—Robert E. Burns

[57] ABSTRACT

An improved gate circuit for sampling the amplitude of high frequency signals. The circuit is provided with a shunt element and/or a diode for conducting the gate pulses so as to apply the gate pulses to the connecting point between diodes of a series circuit connected between an output terminal and the high frequency signal, thereby preventing the distortion of the waveform originated by the reflection of the measuring signal. Also disclosed is an improved circuit wherein a capacitor having a value of at least 300 pf is coupled from a point of the series circuit to ground, thereby preventing a leakage signal from appearing at the output terminal. These combined improvements yield better high frequency characteristics for the gate circuit.

16 Claims, 10 Drawing Figures

GATE CIRCUIT

Figure 1:
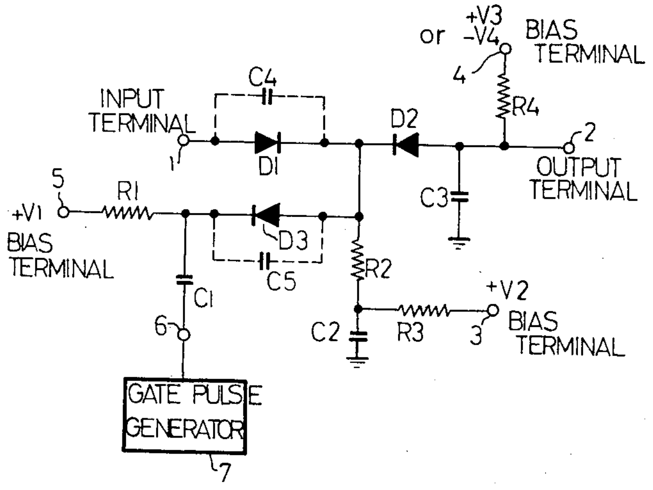

This application is a continuation of Ser. No. 752209 filed 13, Aug. 1968, now abandoned.

The present invention relates to an improved gate circuit for sampling the amplitude of high and low frequency signals, and more particularly, to a wideband gate circuit for sampling the amplitude of an input signal.

As it is well-known, a circuit between the input and output terminals of a sampling circuit is usually held in a nonconductive state, while the circuit becomes conductive when very narrow gate pulses are applied thereto.

Generally, in gate circuit, a stray capacitance exists between the output terminal and ground, and a certain resistance also exists between the input and output terminals even if in the conductive state. Consequently, a time constant defined by the product of the stray capacitance and the resistance exists in the above-mentioned gate circuit. The sampled input signal is stored in the stray capacitance during application of the gate pulse to the gate circuit but the period of application of the gate pulse is not sufficiently larger than the above-mentioned time constant. Therefore, it is understood that the stored voltage, in other words, the amplitude of the sampled signal which at the output terminal, is smaller than the amplitude of the input signal.

It is well-known that the shorter the application period of the gate pulse the signal frequency in which its amplitude can be sampled is higher, that is, in the above-mentioned condition, the gate circuit becomes more wideband, on the other hand, the sampled signal which appears at the output terminal becomes smaller by the effect of the time constant of the circuit.

The relation between the bandwidth $f_o$ and the period of the applied gate pulse $\tau$ is represented by the following equation, that is $$\tau \cdot f_o = 0.44$$

Therefore, if $\tau$ is 60 ps, $f_o$ is calculated as about 7 $GH_z$.

The above-mentioned wideband gate circuit comprises a plurality of diodes, wherein the capacitance in the circuit between the input and output terminals is almost 0.5 PF and the inverse resistance of the circuit is larger than several megohms. A leakage signal from the input terminal appears at the output terminal in the nonconductive state of the gate circuit provided with the above-mentioned state of the capacitance and inverse resistance. Consequently, this leakage signal is superposed to the sampled signal which appears at the output terminal and the above-mentioned combined signal is amplified by the amplifier located after the output terminal, thereby certain distortion of the output waveform is inevitable. Therefore, the sampled signal becomes smaller as the bandwidth of the gate circuit becomes wider. This sampled signal is affected considerably by the leakage signal and is provided with a distinct distortion of the waveform, in other words, the frequency response of the gate becomes poor in the low frequency range.

In the conventional gate circuit, the following drawback was also noticed. When a measuring signal is applied to one terminal of the diode which is an element of the gate circuit, and a gate pulse is applied to another terminal of the diode, the output impedance of the gate pulse generator is small and the output impedance fluctuates in accordance with the frequency. Even if the diodes are held in a nonconductive state, this impedance is loaded to the input terminal through a capacitance between the terminals of the diode connected to the input terminal, thereby the waveform of the measuring signal is distorted and certain remarkable unevenness of the frequency response is noticed in the high frequency range. It is difficult to match the output impedance of the gate pulse generator in a wideband, that is, the voltage standing wave ratio (V.S.W.R.) of the output terminal is considerably large. To make the pulse width of generated gate pulse narrow, a short stub is used in the gate pulse generator, thereby the pulse width is reduced to correspond to the period required for both ways to the short stub. However, V.S.W.R. of the short stub is infinity and the gate pulse is obtained by the full reflection. By the above-mentioned character of the short stub, a part of the measuring signal reflects at the pulse generator provided with the short stub via capacitance between the terminals of the diode connected to the input terminal and reflects to the input terminal, thereby the measuring signal is superposed by the reflecting wave and its waveform is distorted, in other words, an unevenness of the high frequency response is observed.

Therefore, the principal object of the present invention is to provide an improved gate circuit for eliminating the above-mentioned drawbacks.

Another object of the present invention is to provide an improved gate circuit having the function of preventing reflection of a certain part of the measuring signal which comes to the gate pulse generator and reflects to the input terminal.

Further object of the present invention is to provide an improved gate circuit which can eliminate leakage signal.

Still further object of the present invention is to provide an improved gate circuit which can eliminate the leakage signal, and further having a function of preventing reflection of a certain part of the measuring signal which comes to the gate pulse generator and reflects to the input terminal.

Figure 4:
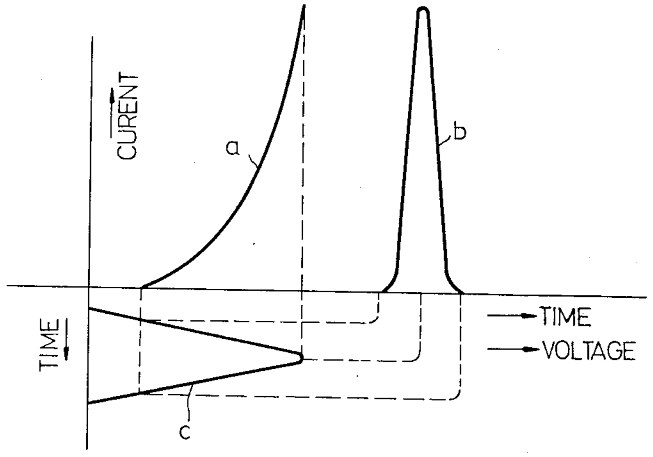

In summary, this invention provides an improved gating circuit for high frequency signals (see FIGS. 1 and 5) wherein a diode $D_3$ or diodes $D_8$ and $D_9$ are added to a conventional gating circuit, together with a termination resistor $R_2$ or resistors $R_6$ and $R_8$ and a capacitor $C_3$ or $C_8$ thereby preventing distortion of the high frequency waveform originated by the reflection of the measuring signal. Further, the sharpness and the amplitude of the gate pulse is controlled by adjusting the bias current of a diode $D_3$ or diodes $D_8$ and $D_9$ as shown in FIG. 4

Figure 6:
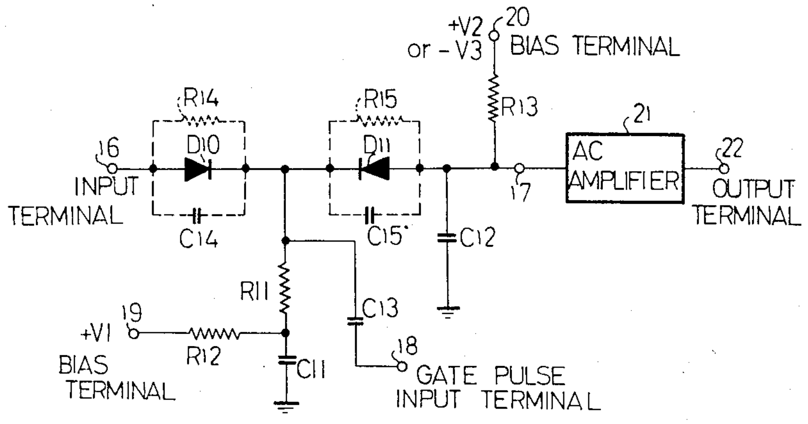
Figure 7:
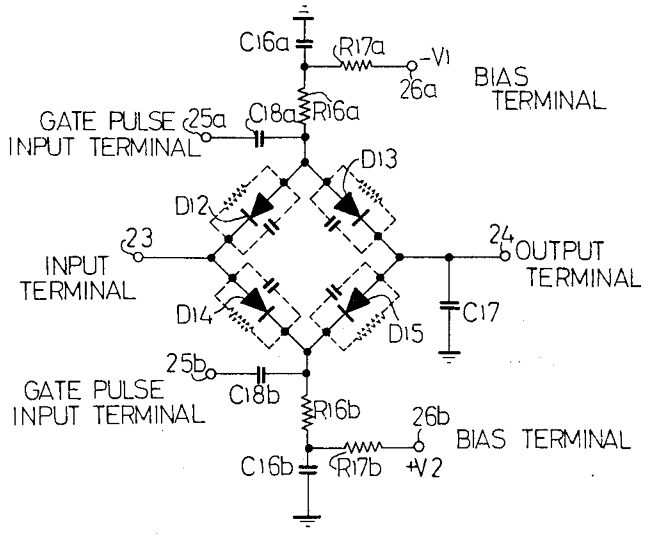

Furthermore, an improvement of the frequency characteristics of a conventional gate circuit is realized (as shown in FIGS. 6 and 7) by adding a termination resistor $R_{11}$, or resistors $R_{16a}$ and $R_{16b}$, and a capacitor $C_{11}$, or $C_{16a}$, and $C_{16b}$, each having a capacitance value greater than 300 pF, thereby preventing leakage of the measuring signal to the output terminal.

Finally, an improvement of high frequency characteristics of a conventional gate circuit (FIG. 8 and FIG. 9) is provided by combining the above-mentioned improvements. In this case, capacitors $C_{21}$ and $C_{27}$ are provided for storing the amplitude component of the output signal of the gate circuit as in the high frequency circuits.

Figure 2:
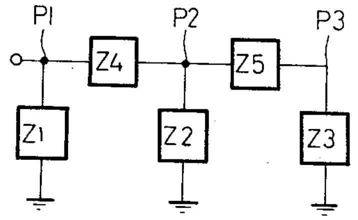
Figure 3:
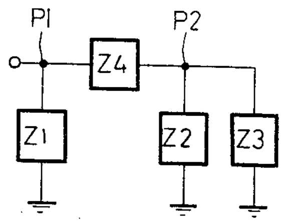
Figure 5:
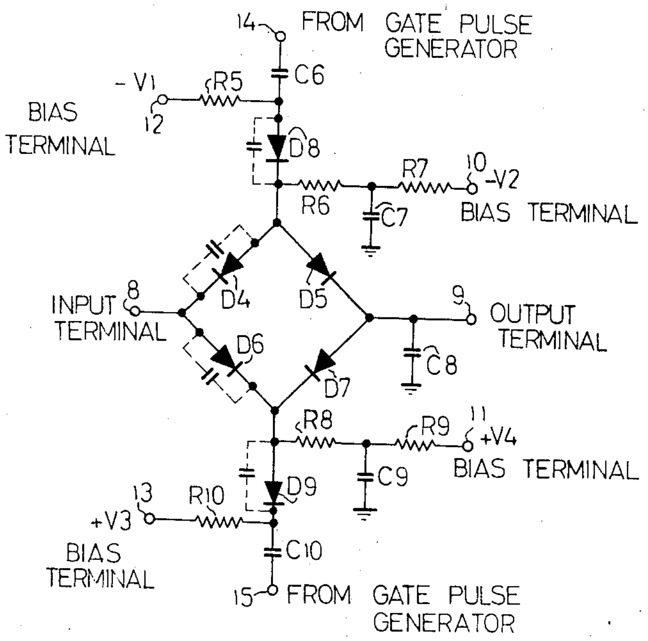

The accompanying drawings illustrate various embodiments of the invention. In such drawings:

FIG. 1 is a schematic diagram illustrating an embodiment of the gate circuit of the present invention, FIG. 2 is a schematic diagram of an equivalent circuit of the gate circuits shown in FIG. 1, FIG. 3 is a schematic diagram of an equivalent circuit of a gate circuit in which the gate circuit shown in FIG. 1 is modified, FIG. 4 is a characteristic diagram of a diode, FIG. 5 is a schematic diagram illustrating another embodiment of the gate circuit of the present invention, FIGS. 6 to 10 are also schematic diagrams illustrating other embodiments of the gate circuit of the present invention.

In a gate circuit for improving high frequency sampling characteristics, as shown in FIG. 1, one embodiment of the invention comprises an input terminal 1 to which a measuring signal is applied, an output terminal 2 in which a sampled signal appears, diode $D_1$, $D_2$ and $D_3$, terminals 3, 4 and 5 to which bias current is applied so as to maintain these diodes $D_1$, $D_2$ and $D_3$ normally in the nonconductive condition, resistors $R_1$, $R_2$ and $R_4$ for applying the above-mentioned bias current, a gate pulse input terminal 6 connecting to a gate pulse generator 7 and applying the gate pulse to the diodes $D_3$, $D_1$ and $D_2$ for the purpose of transforming the diodes $D_1$, $D_2$ and $D_3$ to the conducting state by overcoming those bias state, a capacitor $C_3$ located between the terminal 2 and ground, a capacitor $C_1$ connected to the terminals 6 and a cathode of the diode $D_3$ so as to prevent application of the bias to the gate pulse generator 7, a resistor $R_2$ which terminates the gate pulse, and a capacitor $C_2$ by which one terminal of $R_2$ is grounded in a high frequency range. The terminals 5 and 3 are connected to the positive potential sources $+V$ and $+V_2$ respectively, and the terminal 4 is connected to a positive or a negative potential source $+V_3$ or $-V_4$, depending on the values of the potential of the terminals 5 and 6. In the above-mentioned gate circuit shown in FIG. 1, $C_4$ and $C_5$ designate terminal capacitances of the diodes $D_1$, $D_3$ respectively, in the nonconducting state.

The diode $D_3$ is usually in a nonconductive state and the gate pulse is applied to the connection point of $D_1$ and $D_2$ via the diode $D_3$. The value of the capacitances $C_4$ and $D_5$ are about 0.5 PF and $R_2$ is about 50Ω, because it is necessary to match to the output impedance of the gate pulse generator 7. The input impedance of terminal 1 is matched with the characteristic impedance and terminated by a termination. The characteristic impedance is about 50Ω.

The schematic diagram shown in FIG. 2 is an equivalent circuit of FIG. 1 in the nonconductive state. The schematic diagram shown in FIG. 3 is a traditional equivalent circuit in the nonconductive state wherein capacitor $C_1$ is connected to the connecting point of the diodes $D_1$ and $D_2$, and the resistor $R_1$ and the diode $D_3$ are omitted. $Z_1$ designates an impedance of the termination at the terminal 1, $Z_2$ designates an impedance composed of $R_2$ and $C_2$, $Z_3$ designates an output impedance of the gate pulse generator 7,and $Z_4$ and $Z_5$ designate impedance of $C_4$ and $C_5$, respectively. $Z_1$ and $Z_2$ are also constant over the entire frequency range. The impedance $Z_4$ and $Z_5$ decrease as the frequency becomes high. However, the impedance $Z_3$ is considerably altered with a change in frequency, thereby the frequency characteristic at the terminal 1 becomes uneven and the input waveform is distorted by the superposed reflected wave upon the input waveform.

Particularly in FIG. 3, the measuring signal applied to the terminal 1 does not appeare at the point $P_2$ because the impedance $Z_4$ is sufficiently large in a frequency region below 0.5 $GH_z$. As a considerably small signal is reflected at $Z_3$ and is further attenuated after passing through $Z_4$, the influence of the reflected wave does not appear at the terminal 1. On the other hand, when the frequency is made high and becomes more than 3 $GH_z$, then $Z_4$ decreases, a considerable amount of the measuring signal passes through $Z_4$ and reflects at $Z_3$ and then passes $Z_4$, and finally is reflected to the point $P_1$. The measuring signal is attenuated at the line from $P_1$ to $P_2$, and is further attenuated at the return line from $P_2$ to $P_1$,although the above-mentioned attenuation is not sufficient. This attenuation can be considered as an attenuation of type $\pi$ attenuator.

However, as shown in FIG. 2, although the frequency is made high, the signal is attenuated at the go-line from $P_1$ to $P_2$ and is attenuated further at the line from $P_2$ to $P_3$ by the addition of $Z_5$. And the reflected wave at $Z_3$ is attenuated at a return line from $P_3$ to $P_2$ and is attenuated further at a line from $P_2$ to $P_1$. Consequently, the reflected wave to the terminal 1 becomes very small. The above-mentioned attenuation can be considered as an attenuation of the series of two type $\pi$ attenuations. Consequently, the frequency characteristics in the high frequency range is improved and then the pulse response to the high speed pulse is improved, that is, the distortion of the waveform is effectively eliminated. Further, it was noticed that the attenuation of the gate pulse of the diode $D_3$ in the conductive state is very small.

Figure 10:
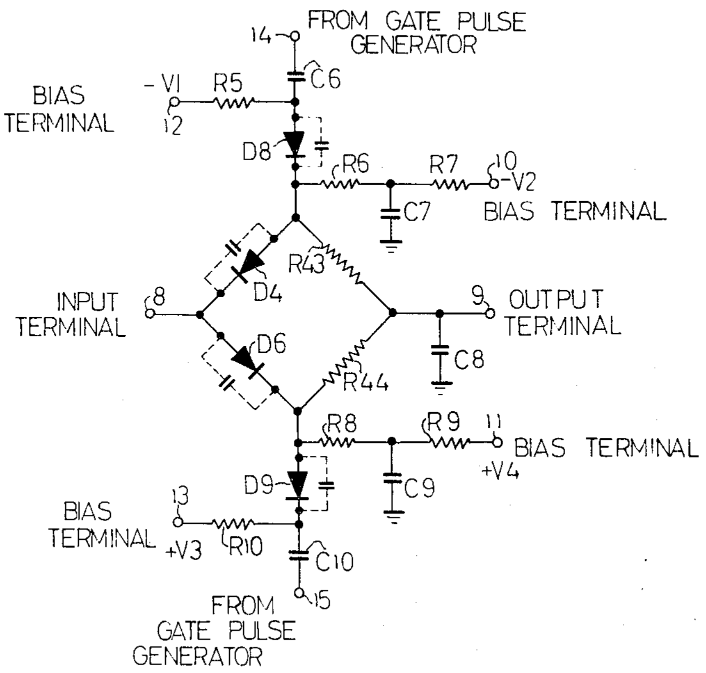

The current-voltage characteristics of the diode $D_3$ is non-linear as shown in FIG. 4. When the gate pulse is applied to the diode $D_3$, a pulse which is sharper than the applied pulse is effectively obtained. Further, the amplitude of the current wave in the diode $D_3$ is adjustable by adjusting the bias current of $D_3$. In case of the polarities of the diodes $D_1$, $D_2$ and $D_3$ are inversed, the same result can be obtained as shown in FIG. 1, by inversion of the polarity of the gate pulse and adjustment of each bias. Further in the case where diode $D_2$ is replaced by a resistor 42, as shown in FIG. 10, the same result can be obtained. In the circuit of FIG. 10, the terminal 4 and the resistor 4, as shown in FIG. 1, are not necessary.

In another embodiment of the gate circuit of the present invention shown in FIG. 5, the first series element composed of diodes $D_4$ and $D_5$ and the second series element composed of diodes $D_6$ and $D_7$ are connected to each other. In the first series element, the anode of the diode $D_4$ is connected with the the anode of the diode $D_5$ while in the second series element the cathode of the diode $D_6$ is connected with the cathod of the diode $D_7$. One of the connecting points of the above-mentioned connection of the two series elements is used as a terminal 8 for applying the measuring signal, while the one of the other connecting points is used as a terminal 9 for output signal. The connecting point of the diodes $D_4$, $D_5$ and $D_6$, $D_7$ are connected to the bias terminals 10, 11 via bias resistors $R_6$, $R_7$, and $R_8$, $R_9$, respectively, and the bias terminals 12, 13 are connected to the connection points of the diode $D_4$, $D_5$ and $D_6$, $D_7$, respectively, via resistor $R_5$, diode $D_8$ which corresponds to the diode $D_3$ in FIG. 1 and resistor $R_{10}$, diode $D_9$ which corresponds to $D_3$ in FIG. 1, and terminals 14 and 15 are connected to the connection points of the resistor $R_5$, diode $D_8$ and the resistor $R_{10}$, diode $D_9$, respectively, via capacitors $C_6$ and $C_{10}$. The gate pulse is applied to the terminals 14 and 15. In the gate circuit shown in FIG. 5, the capacitors $C_7$ and $C_9$ correspond to the capacitance $C_2$ of the gate circuit shown in FIG. 1 and capacitance $C_8$ corresponds to the capacitor $C_3$ of the gate circuit shown in FIG. 1. Further, when resistors 43 and 44 are substituted for the diodes $D_5$ and $D_7$, the same effect as the above-mentioned gate circuit can be obtained in the gate circuit shown in FIG. 5.

Further, it is possible of course to insert a transmission line at a position between the connecting point of the diode $D_3$ and the resistor $R_2$ and the connecting point of the diodes $D_1$ and $D_2$, and to insert a cable at a position between the diode $D_3$ and the resistor $R_2$ in the gate circuit shown in FIG. 1, to obtain a similar effect as mentioned above. It was also confirmed that a similar effect can be obtained by insertion of a transmission line in case of the gate circuit shown in FIG. 5.

As described above, when the bandwidth extends, the reflection of a part of the measuring signal in high frequency range reflected from the gate pulse generator increases, however this unpreferable performance of the gate circuit can be simply and effectively prevented and the high frequency characteristics of the gate circuit can be improved considerably by the present invention.

FIG. 6 relates to a gate circuit for improved low frequency characteristics, and discloses an input terminal 16 to which a measuring signal is applied, an output terminal 17 in which a sampled signal appears, the gate pulse input terminal 18 to which the gate pulse is applied, a pair of high speed switching diodes $D_{10}$ and $D_{11}$ which are usually biased to the nonconductive state, bias terminals 19 and 20, capacitor $C_{13}$ inserted between the terminal 18 and the connecting point between the diodes $D_{10}$ and $D_{11}$ to prevent application of bias to the gate pulse input terminal 18, a stray capacitance $C_{12}$ existing between the output terminal 17 and ground, resistors $R_{12}$ and $R_{13}$ for applying the bias current, the bias resistor $R_{11}$ which acts as a terminal resistance for the gate pulse and to which the bias current is applied, a capacitor $C_{11}$ which connects one terminal of $R_{11}$ to ground in the high frequency range, inverse resistances $R_{14}$ and $R_{15}$ and stray capacitances $C_{14}$ and $C_{15}$, in the nonconductive state of the diodes $D_{10}$ and $D_{11}$, an A.C amplifier 21 which amplifies the signal appearing in the output terminal 17, and an output terminal 22 of the A.C amplifier 21. In the usual condition, the diodes $D_{10}$ and $D_{11}$ have respectively, capacitances $C_{14}$, $C_{15}$ and resistances $R_{14}$, $R_{15}$ as defined inthe above-mentioned explanation. As a result of this, even in the nonconducting state, the measuring signal appears as a leakage signal signal at a terminal 17 via capacitances $C_{14}$, $C_{15}$ and resistances, $R_{14}$, $R_{15}$. This leakage signal is superposed on the measuring signal and amplified by the AC amplifier, whereby the protection appears in the frequency range between several $kH_z$ and several $MH_z$ in the frequency characteristic curve. Accordingly, the square wave applied to the input terminal cannot reappear in the output terminal without distortion.

In the above-mentioned gate circuit, the value of $R_{11}$ is chosen sufficiently small with respect to the value of $R_{14}$ and the time constant $C_{14} \times R_{11}$ of the gate circuit is chosen sufficiently small. It is desirable to chose the value of the $R_{11}$ to match the impedance of the gate circuit so as to act as a terminal resistance for the gate pulse. In this case, $R_{11}$ is about 50 Ω. And a suitable value of the capacitor $C_{11}$ is several 10 PF so as to act as the terminal resistance for the gate pulse, however, it is preferable to chose a very large value for the capacitance $C_{11}$, such as more than 300 PF, preferably 1,000 PF. That is, by the action of $C_{14}$, $R_{14}$ as a series element of type L attenuator and action of $R_{11}$, $C_{11}$ as a shunt element to the input signal and making the attenuation ratio of the attenuator in the frequency range of the A.C amplifier 21 very large, the leakage signal can be attenuated and applied to the A.C amplifier 21. Even if a leakage signal which has higher frequency than the upper limit frequency or lower frequency than the lower limit frequency of the A.C amplifier 21 exist, these signals are not amplified at the A.C amplifier 21, therefore the objective signal is only obtained at the output terminal 22 of the amplifier 21. The bias current is applied at the connecting point between $R_{11}$ and $C_{11}$, via $R_{12}$. This bias can also be applied to the connecting point between $D_{10}$, $D_{11}$ via certain connecting means. It is also possible to change the polarity of $D_{10}$, $D_{11}$ and the gate pulse, and apply a certain suitable bias current.

As shown in FIG. 7, the two series elements composed of four diodes mentioned above can be connected. A transmission line can be inserted to a position between the shunt element of the type L attenuator and a connecting point of the diodes, in this case a gate pulse can be applied to a connecting point of the shunt element with the transmission line, or to a connecting point of the diodes through a transmission line.

In the above-mentioned gate circuit, each element of the gate circuit shown in FIGS. 6 and 7 correspond as follows; terminals 16 to 23, terminal 17 to 24, terminal 18 to 25a or 25b, terminal 19 to 26a or 26b, $C_{11}$ to $C_{16a}$ or $C_{16b}$, $C_{12}$ to $C_{17}$, $C_{13}$ to $C_{18a}$ or $C_{18b}$, $D_{10}$ to $D_{12}$ or $D_{14}$, $D_{11}$ to $D_{13}$ or $D_{15}$, $R_{11}$ to $R_{16a}$ or $R_{16b}$ and $R_{12}$ to $R_{17a}$ or $R_{17b}$, respectively.

In the above-mentioned illustration, a resistance and capacitance are used as shunt elements $R_{11}$ and $C_{11}$, but inductance can be used instead of the resistance $R_{11}$, or a combination of a resistance and inductance can be used as shunt elements.

As mentioned above, the sampled signal becomes small and the effect of the leakage signal increases as the bandwidth is made wide, however, in the bandwidth wider than 0.5 $GH_z$, and in case of the capacitance of the shunt element is larger than 300 PF, the effective result of the present invention can be expected.

Figure 8:
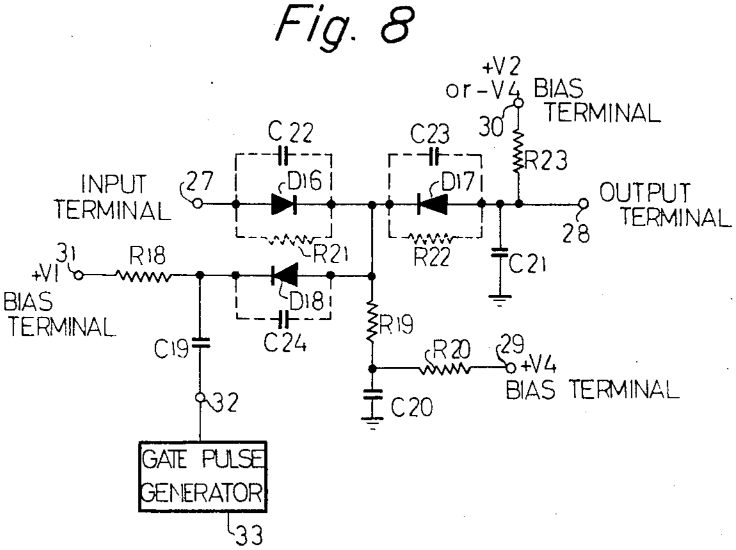

FIG. 8 relates to a gate circuit for improving its high frequency characteristics and its low frequency characteristics, that is, FIG. 8 is considered as the combination of FIG. 1 and FIG. 6. In FIG. 8, the gate circuit of the invention comprises an input terminal 27 to which a measuring signal is applied, an output terminal 28 where a sampled signal appears, diodes $D_{16}$, $D_{17}$ and $D_{18}$, terminals 29, 30 and 31 to which the bias is applied to hold $D_{16}$, $D_{17}$, $D_{18}$ normally in a nonconductive state, resistors $R_{18}$, $R_{19}$, $R_{20}$ and $R_{23}$ to which the bias current is applied, terminal 32 to which a negative pulse is applied from a gate pulse generator 33 so as to change $D_{16}$, $D_{17}$, $D_{18}$ into conductive states by overcoming the above-mentioned bias condition, a capacitor $C_{21}$ connecting the output terminal 28 to ground, a capacitor $C_{19}$ which prevents the bias current from going toward the gate pulse generator 33, resistor $R_{19}$ which terminates the gate pulse, and capacitor $C_{20}$ by which one terminal of $R_{19}$ is connected to ground at high frequency. In the above-mentioned gate circuit, $C_{22}$, $C_{24}$ and $C_{23}$ are terminal capacitances of the diodes $D_{16}$, $D_{17}$ and $D_{18}$, $R_{21}$, $R_{22}$ are inverce resistance of the diodes $D_{16}$ and $D_{17}$ in the nonconductive state.

The diode $D_{18}$ is usually maintained in the nonconductive stage, and a gate pulse is applied via the diode $D_{18}$ to the connecting point between $D_{16}$ and $D_{17}$ the values of the capacities of. $C_{22}$, $C_{24}$ and $C_{23}$ are about 0.5 PF each the value of. $R_{19}$ is chosen as about 50Ω, because it is necessary to match to the output impedance of the gate pulse generator 33. The input terminal 27 is matched with the characteristic impedance and is terminated by the characteristic impedance of about 50 Ω. And a suitable value of the capacitor $C_{20}$ is several 10 PF so as to act as the terminal resistance for the gate pulse, however, it is preferable to chose a very large value for the capacitance such as 1,000 PF.

Therefore, $C_{22}$, $R_{21}$ act as series element of type L attenuator for the input signal, $R_{19}$, $C_{20}$ act as shunt element, an attenuation ratio of the attenuator in the region the band of an A.C. amplifier following the terminal 28 is designed very large, thereby the leakage signal is attenuated and applied to the A.C amplifier. Consequently, even in case a leakage signal which is higher than the upper limit frequency or lower than the limit frequency of the A.C. amplifier exists, this signal is not amplified at the A.C amplifier, thereby the objective signal is obtained only at the output terminal of the amplifier, in other words, the characteristics of the gate circuit in low frequency can be improved by applying the gate circuit shown in FIG. 8.

Further, the high frequency characteristics of the gate circuit is also improved, that is, the pulse response for high speed pulse is improved, in other words, the distortion of waveform is effectively eliminated by the applying gate circuit shown in FIG. 8.

Further, it must be noticed that the attenuation of gate pulse of the diode $D_{18}$ is very small.

In the gate circuit shown in FIG. 8, the bias is applied to a connecting point between $R_{19}$ and $C_{20}$, via resistance $R_{20}$, and in certain cases, this bias is directly applied to a connecting point between $D_{16}$ and $D_{17}$ via a connection. The polarities of the diode $D_{16}$, $D_{17}$ and $D_{18}$ can be inversed and the same result as mentioned above can be obtained by inversion of the polarity of the gate pulse and adjustment of bias.

Figure 9:
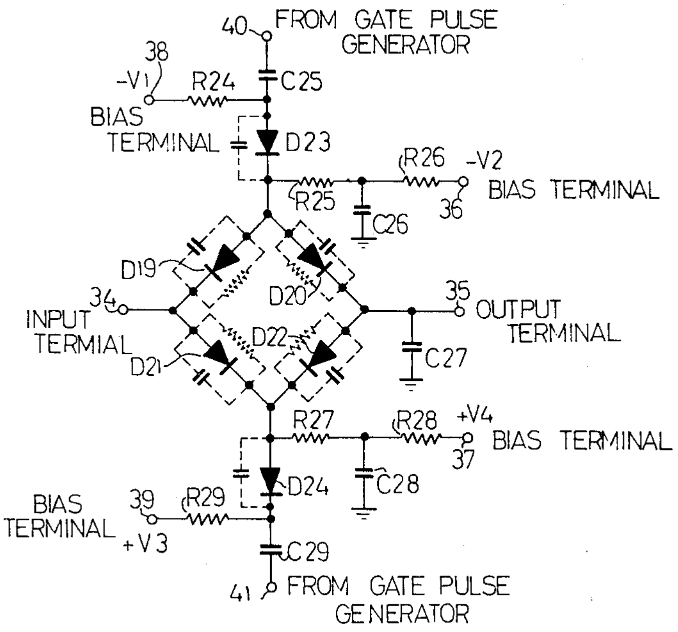

The gate circuit shown in FIG. 9 is also a modification of the gate circuit shown in FIG. 8. In the gate circuit shown in FIG. 9, the series element composed of $D_{19}$, $D_{20}$ wherein anodes are connected to each other and series element composed of $D_{21}$ and $D_{22}$ wherein cathode are connected to each other, are connected in parallel, a measuring signal is applied to an input terminal 34 and the sampled signal appears at an output terminal 35, bias terminals 36, 37 are connected to connecting points of $D_{19}$, $D_{20}$ and $D_{21}$, $D_{22}$ via bias resistors $R_{25}$, $R_{26}$ and $R_{27}$, $R_{28}$, respectively, and bias terminals 38, 39 are connected to a connection point of the diodes $D_{19}$ and $D_{20}$ via resistance $R_{24}$ and diode $D_{23}$ which corresponds to the diode $D_{18}$ shown in FIG. 8, and via resistor $R_{29}$ and diode $D_{24}$ which corresponds to the diode $D_{18}$ shown in FIG. 8, and terminals 40 and 41 to which the gate pulse is applied via blocking capacitors $C_{25}$ and $C_{29}$ and diodes $D_{23}$ and $D_{24}$ to the connection points of the diodes $D_{19}$, $D_{20}$ and $D_{21}$, $D_{22}$, respectively. Capacitors $C_{26}$, $C_{28}$ correspond to $C_{20}$ in FIG. 8 and capacitor $C_{27}$ corresponds to $C_{21}$ in FIG. 8.

While the invention has been described in conjunction with certain embodiments thereof it is to be understood that various modification and changes may be made without departing from the spirit and scope of the invention.

What I claim is:

1. An improved gate circuit comprising at least one series element composed of a pair of diodes connected together by like electrodes, and having their opposed electrodes connected respectively as input and output terminals of said series element, means for applying a signal to be sampled to said input terminal, means for applying gate pulses to the junction between said diodes of said series element, wherein said gate pulses satisfy the relation $\tau f_o \approx 0.44$ where $\tau$ is the application period of said gate pulses and $f_o$ is the frequency bandwidth of said signal to be sampled, means for normally biasing said diodes into a conductive state during the periods of said gate pulses and a capacitor connected between said output terminal and ground, wherein said means for applying gate pulses comprises a gate pulse generator and a gating diode interconnected between said gate pulse generator and said junction between said like electrodes of said diodes, thereby preventing a reflection of said measuring signals and improving the high frequency characteristics of said gate circuit.

2. An improved gate circuit according to claim 1, further comprising means for adjusting the bias voltage on said gating diode for controlling the amplitude and slope of said gate pulses.

3. An improved gate circuit comprising at least one series element composed of a pair of diodes connected together by like electrodes, and having their opposed electrodes connected respectively as input and output terminals of said series element, means for applying measuring signals to said input terminal, means for applying gate pulses to the junction between said diodes of said series element, wherein said gate pulses satisfy the relation $\tau f_o \approx 0.44$ where $\tau$ is the application period of said gate pulses and $f_o$ is the frequency band-width of said measuring signals, means for normally biasing said diodes in a nonconductive state, means for biasing said diodes into a conductive state during the period of said gate pulse, and a capacitor connecting said output terminal to ground, and further comprising a shunt capacitor having a value of at least 300 PF and coupled between said junction between like diode electrodes and ground, thereby preventing a leakage signal at said output terminal and improving the frequency characteristics of said gate circuit.

4. The invention as set forth in claim 3, in which said means for applying said gate pulses comprises a gate pulse generator and a gating diode coupled between said gate pulse generator and said junction between like diode electrodes, thereby preventing a reflection of said measuring signals and improving the high frequency characteristics of said gate circuit.

5. An improved gate circuit according to claim 4, further comprising means for adjusting the bias voltage on said gating diode for controlling the amplitude and slope of said gate pulses.

6. An improved gate circuit according to claim 5, further comprising means for adjusting the bias current of said gating diode for controlling the amplitude and slope of said gate pulses.

7. An improved gate circuit comprising a pair of series elements wherein one series element is composed of a pair of diodes having their anodes connected together and another series element is composed of a pair of diodes having their cathodes connected together and wherein said two series elements are connected in parallel, an input terminal connected to one connecting point of said two series elements, an input terminal connected to the other connecting point of said two series elements, means for applying measuring signals to said input terminal, means for applying gate pulses to each connecting point between like electrodes of said diodes of each series element, wherein said gate pulses satisfy the relation $\tau f_o \approx 0.44$ where $\tau$ is the application period of said gate pulses and $f_o$ is the frequency bandwidth of said measuring signals, means for normally biasing said diodes in a nonconductive state, means for biasing said diodes in a conductive state during the period of said gate pulse, and a capacitor connected between said output terminal and ground, wherein said means for applying gate pulses comprises a gate pulse generator and a pair of gating diodes interconnected respectively between said gate pulse generator and said junctions between said like electrodes of said diodes, thereby preventing a reflection of said measuring signals and improving the high frequency characteristics of said gate circuit.

8. An improved gate circuit according to claim 7, further comprising means for adjusting a bias voltage on each said gating diode, for controlling the amplitude and slope of said gate pulses.

9. An improved gate circuit comprising a pair of series elements wherein one series element is composed of a pair of diodes having their anodes connected together and another series element is composed of a pair of diodes having their cathodes connected together, and wherein said two series elements are connected in parallel, an input terminal connected to one connecting point of said two series elements, an output terminal connected to the other connecting point of said two series elements, means for applying measuring signals to said input terminal, means for applying gate pulses to each connecting point between like electrodes of said diodes of each series element, wherein said gate pulses satisfy the relation $\tau f_o \approx 0.44$ where $\tau$ is the application period of said gate pulses and $f_o$ is the frequency bandwidth of said measuring signals, means for normally biasing said diodes in a nonconductive state, means for biasing said diodes in a conductive state during the period of said gate pulse, and a capacitor connected between said output terminal and ground, and a pair of shunt capacitors each having a value of at least 300 PF and being coupled respectively between said junctions between like diode electrodes and ground, thereby preventing a leakage signal at said output terminal and improving the frequency characteristics of said gate circuit.

10. The invention as set forth in claim 9, in which said means for applying said gate pulses comprises a gate pulse generator and a pair of gating diodes coupled respectively between said gate pulse generator and said junctions between like diode electrodes, thereby preventing a reflection of said measuring signals and improving the high frequency characteristics of said gate circuit, and further comprising means for adjusting a bias voltage on said gating diodes for controlling the amplitude and slope of said gate pulses.

11. An improved gate circuit according to claim 10, further comprising means for adjusting the bias current of said gating diode for controlling the amplitude and slope of said gate pulses.

12. An improved gate circuit comprising first and second series elements each including a diode and a resistor, said series elements being connected in parallel so that said diodes are arranged with opposing polarities in said parallel combination of series elements, an input terminal connected to one end of said parallel combination, an output terminal connected to the other end of said parallel combination, means for applying measuring signals to said input terminal, means for applying gate pulses to each connecting point between said diode and said resistor in each said series element, wherein said gate pulses satisfy the relation $\tau f_o \approx 0.44$ where $\tau$ is the application period of said gate pulses and $f_o$ is the frequency band width of said measuring signals, means for normally biasing said diodes in a nonconductive state, means for biasing said diodes into a conductive state during the periods of said gate pulses, a capacitor connected from said output terminal to ground, wherein said means for applying gate pulses comprises a gate generator circuit and a pair of gating diodes coupled respectively between said gate generator circuit and the junctions between said diode and resistor in each said series element, thereby preventing a reflection of said measuring signals at the gate pulse generator and improving the high frequency characteristics of said gate circuit.

13. An improved gate circuit according to claim 12, further comprising means for adjusting a bias voltage of said gating diodes for controlling the amplitude and a sharpness of said gate pulses.

14. An improved gate circuit comprising at least one series element composed of a first diode and a resistor, one terminal of said diode being connected to one terminal of said resistor, an input terminal connected to the other terminal of said diode, an output terminal connected to the other terminal of said resistor, means for applying measuring signals to said input terminal, means for applying gate pulses to a connecting point between said diode and said resistor, wherein said gate pulses satisfy the relation $\tau f_o \approx 0.44$ where $\tau$ is the application period of said gate pulses and $f_o$ is the frequency band width of said measuring signals, means for normally biasing said diode in a nonconductive state, means for biasing said diode into a conductive state during the periods of said gate pulses, a capacitor connected from said output terminal to ground, and a shunt element having a capacitance of at least 300 PF, said shunt element being connected between said connecting point between said first diode and said resistor and ground, thereby preventing a leakage signal from appearing on said output terminal and improving the frequency characteristics of said gate circuit.

15. An improved gate circuit according to claim 14, wherein said means for applying gate pulses comprises a gate generator circuit and a gating diode coupled between said gate generator circuit and the junction between said first diode and resistor, thereby preventing a reflection of said measuring signals at the gate pulse generator and improving the high frequency characteristics of said gate circuit, and further comprising means for adjusting a bias voltage of said gating diode for controlling the amplitude and slope of said gate pulses.

16. An improved gate circuit according to claim 15, further comprising means for adjusting the bias current of said gating diode for controlling the amplitude and sharpness of said gate pulses.

* * * * *